(12) United States Patent
Tolle et al.

(10) Patent No.: US 6,760,233 B2
(45) Date of Patent: Jul. 6, 2004

(54) LOW-POWER LOW-VOLTAGE POWER SUPPLY

(75) Inventors: Tobias Georg Tolle, Aachen (DE); Thomas Duerbaum, Langerwehe (DE); Pieter Jan Mark Smidt, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 29 days.

(21) Appl. No.: 10/192,263

(22) Filed: Jul. 10, 2002

(65) Prior Publication Data

US 2003/0016546 A1 Jan. 23, 2003

(30) Foreign Application Priority Data

Jul. 12, 2001 (DE) .......................... 101 33 865

(51) Int. Cl.[7] .............................................. H02M 3/335
(52) U.S. Cl. ...................................................... 363/16
(58) Field of Search .................... 363/16, 17, 131, 363/132

(56) References Cited

U.S. PATENT DOCUMENTS

| 3,355,650 A | 11/1967 | Tolmie | |
|---|---|---|---|
| 6,373,725 B1 * | 4/2002 | Chang et al. | 363/21.01 |
| 6,496,387 B2 * | 12/2002 | Halberstadt | 363/17 |

FOREIGN PATENT DOCUMENTS

| DE | 4037722 | 11/1991 |
|---|---|---|
| EP | 0229950 | 7/1990 |

* cited by examiner

*Primary Examiner*—Shawn Riley

(57) ABSTRACT

An electrical circuit arrangement provides a low power rectified low voltage from an AC line voltage. The circuit consists of two circuit blocks combined together via an intermediate circuit, of which the first circuit block contains a capacitive input stage for producing a voltage-limited intermediate voltage that is substantially less than the line voltage, and a second circuit block that contains an asymmetric half-bridge that receives the intermediate voltage and produces an AC voltage that is decoupled from the line voltage via a transformer that is operated at the substantially lower voltage. The output of the transformer is rectified to provide the low-level DC output.

19 Claims, 4 Drawing Sheets

LOW-POWER LOW-VOLTAGE POWER SUPPLY

The present invention relates to an electrical circuit arrangement for producing a low power rectified low voltage from an AC line voltage.

In the present application, low power is understood to mean powers below 5 watts.

For this purpose, power supplies with 50 Hertz transformers are mostly used. These are large, heavy and are not very efficient. In particular, they consume a lot of energy even when their load is switched off.

As an alternative, switched-mode power supplies may be used. Conventional switched-mode power supplies consist of merely a single stage, generally a flyback converter.

If one wishes to operate such switched-mode power supplies at the 230 volt line voltages conventional in Europe, a relatively expensive 600 volts switching transistor is necessary.

In many applications, the high 230 volts input voltage additionally leads to high switching losses.

In addition, the high input voltage requires a transformer with a high main inductance. Consequently, only transformers with large core cross sections and/or large numbers of turns may be used.

A disadvantage of such flyback converters is also the sharp increase in the output voltage and the output power in the event of a regulation fault.

In order to protect the load connected to the low voltage side even when the output voltage increases erroneously sharply, an additional protective circuit has to be installed.

These disadvantages make switched-mode power supplies in the power range below 5 watts more expensive to produce than a 50 Hertz transformer power supply.

A transformer-less power pack is known from EP 0 229 950 B1 which has a capacitive input stage. Such capacitive input stages are also found in U.S. Pat. No. 3,355,650 and in DE 40 37 722 C1.

Such capacitive input stages do not generally offer any line isolation and are therefore not suitable for operating electrical current consuming apparatus which has to be operated with isolated low voltage.

Moreover, where such capacitive input stages are used for very low output voltages, a relatively large input capacitor is necessary.

If it is further assumed that such small power supplies are frequently in operation for days, months or years and for a considerable proportion of that time are kept in no-load operation (stand-by), taken together all current conventional small power supplies constitute a considerable cost factor with regard to total current consumption.

It is therefore an object of the present invention to propose an electrical circuit arrangement for producing a low-power rectified low voltage from an AC line voltage which allows isolated supply of electrical current consuming apparatus which has to be operated in the home and industry at low voltage.

This object is achieved by the invention having the features of claim 1.

Thus, a low-cost low-power power supply (e.g. 2 watts) is provided which transforms electric energy from the domestic electricity supply system of for example 230 volts or 110 volts into potential insulated voltage of for example 6 volts.

A decisive feature of the invention is the combination of two circuit blocks, of which the first circuit block constitutes a capacitive input stage, which generates an intermediate circuit voltage of limited voltage and current, which serves as input voltage for the second circuit block.

The second circuit block comprises first of all essentially an alternating mode operated, asymmetric transistor half-bridge for producing an AC voltage typically of approximately 50 volts with a DC component which typically amounts to around half the intermediate circuit voltage, wherein the AC voltage at this relatively low voltage level is stepped down to the low voltage via a pair of transformer turns and then rectified.

An essential feature of the invention is the successful integration of a capacitive input stage and a downstream half-bridge with subsequent insulation of output and input potential.

In this way, the capacitive input stage reduces the input voltage, rectifies it and limits the input power.

The intermediate circuit voltage produced in this way is limited to a maximum value.

Since the high-frequency line isolation transformer is arranged in the second, downstream circuit block operated at reduced voltage, small, light and small transformers may be used.

By limiting the intermediate circuit voltage, the maximum output values too are limited, so that savings may be made in overvoltage protection at the output of the power pack, i.e. on the low-voltage side.

Furthermore, on the secondary side only one output diode is necessary. Nonetheless, a two-way rectifier may also be provided.

Another essential feature of the invention is that the transistor half-bridge is driven in alternating mode.

Feedback of the output variable of the power supply to the alternating mode clock generators or switching transistors respectively, is not necessary in principle, since even with a fixed duty cycle of the alternating mode clock generators or switching transistors respectively, it is possible to achieve a very good output characteristic. This is an advantage over other switched-mode power supply topologies. The duty cycle p of the half-bridge or of the alternating mode clock is here defined as follows: p=t on/T, wherein t on is the on-time of a particular transistor specified in more detail in the examples of embodiment and T is the duration of a switching cycle. This will be addressed in more detail with reference to the examples of embodiment.

Tests have shown that the maximum voltage arising is typically only 20% above the nominal voltage and the maximum current is typically only 60% above the nominal current.

Nonetheless, feedback is possible, if the output needs to be better regulated.

Moreover, it may be ensured that at the instant of closing of each transistor substantially no voltage is applied thereacross, such that only little effort is required to achieve EMC filtering and in addition the power loss in the transistors is markedly reduced. This effect, however, does not absolutely have to be achieved at all operating points. It may be achieved as a function of a plurality of parameters for all working points of interest.

By operating the second circuit block with the voltage-reduced intermediate circuit voltage, the further advantage is achieved that all semiconductors of the second circuit block together with their drive elements may be integrated with a low-voltage IC. These are understood to mean integrated circuits whose operating voltage is typically below 100 volts. Since, in addition, none of the semiconductors of the first stage are exposed to any higher voltage than the intermediate circuit voltage, these may likewise be integrated with the same IC, but the rectifier diodes thereof often cannot because of their overcurrent bearing capacity.

Furthermore, in addition to unregulated operation, which is suitable for many applications, regulated operation is also possible at low expenditure.

Regulated operation is preferably effected via the duty cycle of the half-bridge. The duty cycle of the half-bridge allows fixed-frequency operation and thus simple EMC filtering. Moreover, the drive signals for the half-bridge signals may be produced with markedly less expenditure in the case of fixed-frequency operation than, for example, regulation via the intermediate circuit voltage. By effecting regulation via the duty cycle of the half-bridge, also the transmission of fluctuations in the intermediate circuit voltage, the output voltage, due to the 50 Hz input signal and due to regulation of the intermediate circuit voltage, may be prevented, so that voltage fluctuations which arise may always be corrected.

This is addressed in greater detail in the examples of embodiment.

The invention will be further described with reference to examples of embodiment shown in the drawings to which, however, the invention is not restricted.

In The Figures

Figure 1:
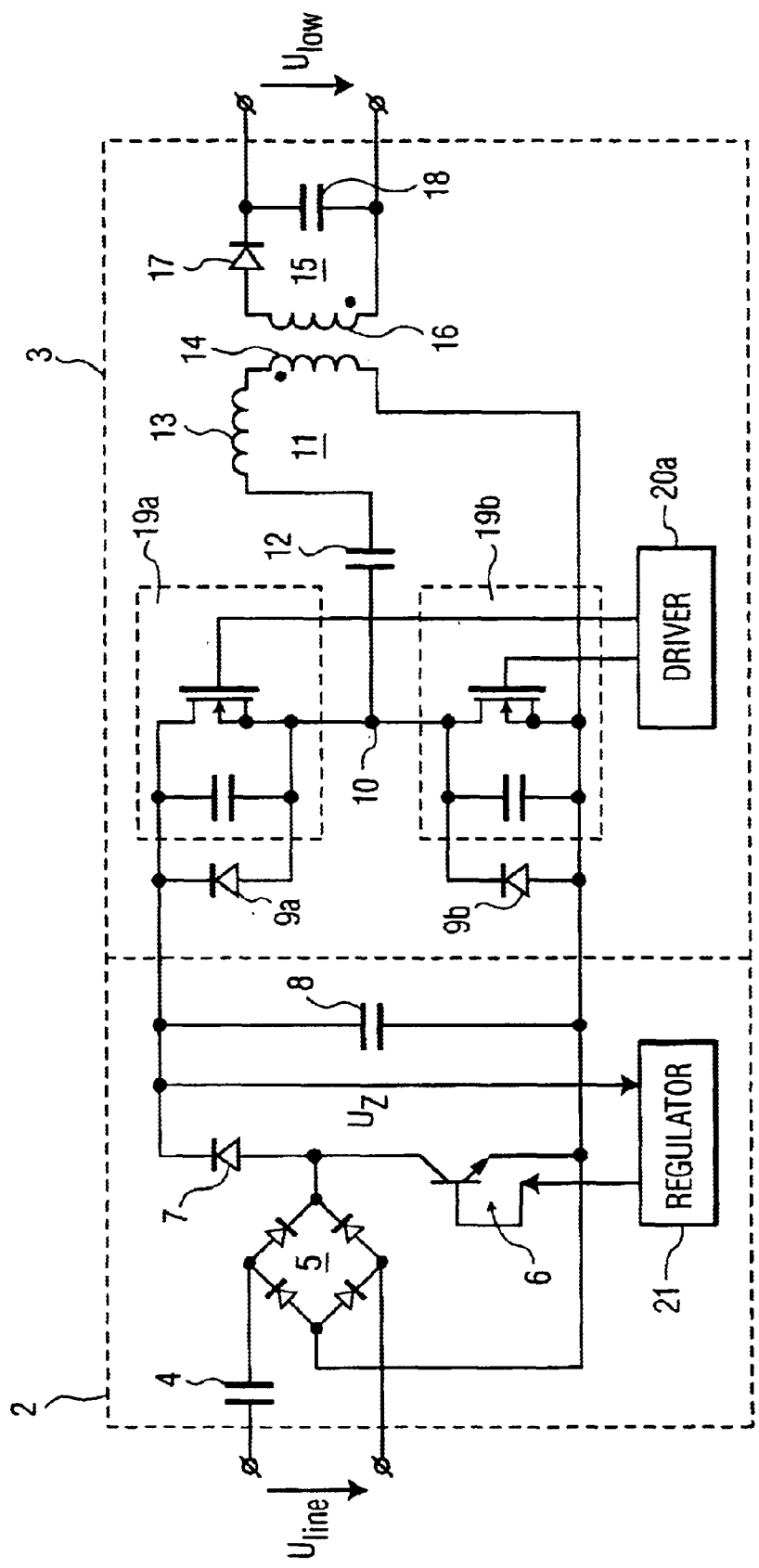
FIG. 1 shows a first example of embodiment of the invention with unregulated low voltage.

Unless stated otherwise below, the following description applies at all times to all the Figures.

The Figures show an electrical circuit arrangement 1 for producing a rectified low voltage $U_{low}$ with small electrical voltage from AC line voltage $U_{line}$.

This circuit arrangement consists in principle of two mutually combined circuit blocks 2 and 3 respectively. The two circuit blocks are combined together so that an intermediate circuit voltage $U_Z$ of limited voltage and current is applied to the connecting point between the first circuit block 2 and the second circuit block 3. The circuit block 2 makes the intermediate circuit voltage, limited in voltage and current, available to the circuit block 3. Said limitation will be addressed in more detail below.

To this end, the first circuit block 2 is exposed to the line voltage $U_{line}$. The line voltage $U_{line}$ provides a line current in the input capacitor 4, which is served up to the rectifier 5 and rectified thereby.

The two outgoing feeders from the rectifier 5 are connected together by an on-off switch 6, which is connected in series with a diode 7, which is conductive in the direction of the second circuit block 3.

Connected in parallel with on-off switch and diode 7 is the bus capacitor 8, on which the intermediate circuit voltage $U_Z$ is impressed. With this circuit arrangement, the two outgoing feeders from the rectifier 5 are thus connected on the one hand to the bus capacitor 8 via a diode 7 and on the other hand to the switch 6, which may short-circuit the two outgoing feeders. In this way, the input current in the bus capacitor 8, which may also be designated intermediate circuit capacitor, may build up the intermediate circuit voltage $U_Z$ and, if the intermediate circuit voltage threatens to become too high, this process may be interrupted by turning on the switch 6. Important factors are that the intermediate circuit voltage $U_Z$ is voltage-limited and that the first circuit block 2 supplies only a limited current.

Current limitation is achieved substantially by the input capacitor 4 and voltage limitation by the on-off switch 6. Voltage limitation is effected by regulated drive of the switch 6, illustrated for example by the regulators 21 and 22. The illustration shows that the regulators 21 and 22 also always have the intermediate circuit voltage $U_Z$ as input value, since this could otherwise rise inadmissibly high.

The intermediate circuit voltage $U_Z$, which lies typically in the region of approximately 50 volts, provided that the line voltage amounts to 100 to 230 volts, is applied to the bus capacitor 8.

This circuit is thus based on the consideration that the current coming from the rectifier 5 may either flow into the switch 6 or into the intermediate circuit capacitor. Switch 6 and intermediate circuit capacitor 8 are thus connected in parallel to the rectifier 5, wherein the diode 7 serves in decoupling.

The intermediate circuit voltage $U_Z$ energizes the alternating mode operated transistor half-bridge 19a, 19b, to the half-bridge point 10 of which a primary circuit 11 is connected. The primary circuit 11 is incorporated via the capacitor 12 and a downstream optional series coil 13 into a transformer circuit with transformer primary coil 14.

The alternating mode is impressed on the transistor half-bridge 19a, 19b via the drive 20a.

On the secondary side a corresponding transformer coil 16 is integrated with a secondary circuit 15. An output diode 17 with a conducting direction towards a tap for the low voltage $U_{low}$ is additionally provided. The capacitor 18 of the secondary circuit 15 is connected in parallel therewith.

Thus, the second circuit block 3 consists substantially of an asymmetrical half-bridge with rectification at the output. The unit described here consists in principle of a DC-DC converter, wherein two circuits 11 and 15 coupled via the transformer coils 14 and 16 are provided to reduce the DC input voltage to the low voltage $U_{low}$.

Thus, the second circuit block comprises, in addition to the half-bridge circuit, the output of which is connected to the transformer via the capacitor 12, (in the present case) one-way rectification downstream of the secondary winding of the transformer and a capacitor 18 for capacitive output filtering. The capacitor 12 is connected in series with the transformer 14, 16 and should, in this example of embodiment, be viewed as a DC decoupling member, the voltage of which changes only insignificantly during a cycle.

However, embodiments are also possible in which the voltage at the capacitor 12 changes considerably during a cycle (resonant converter).

The series coil 13 illustrated in the circuit diagram generally takes the form of a leakage inductor of the transformer 14, 16.

Figure 2:
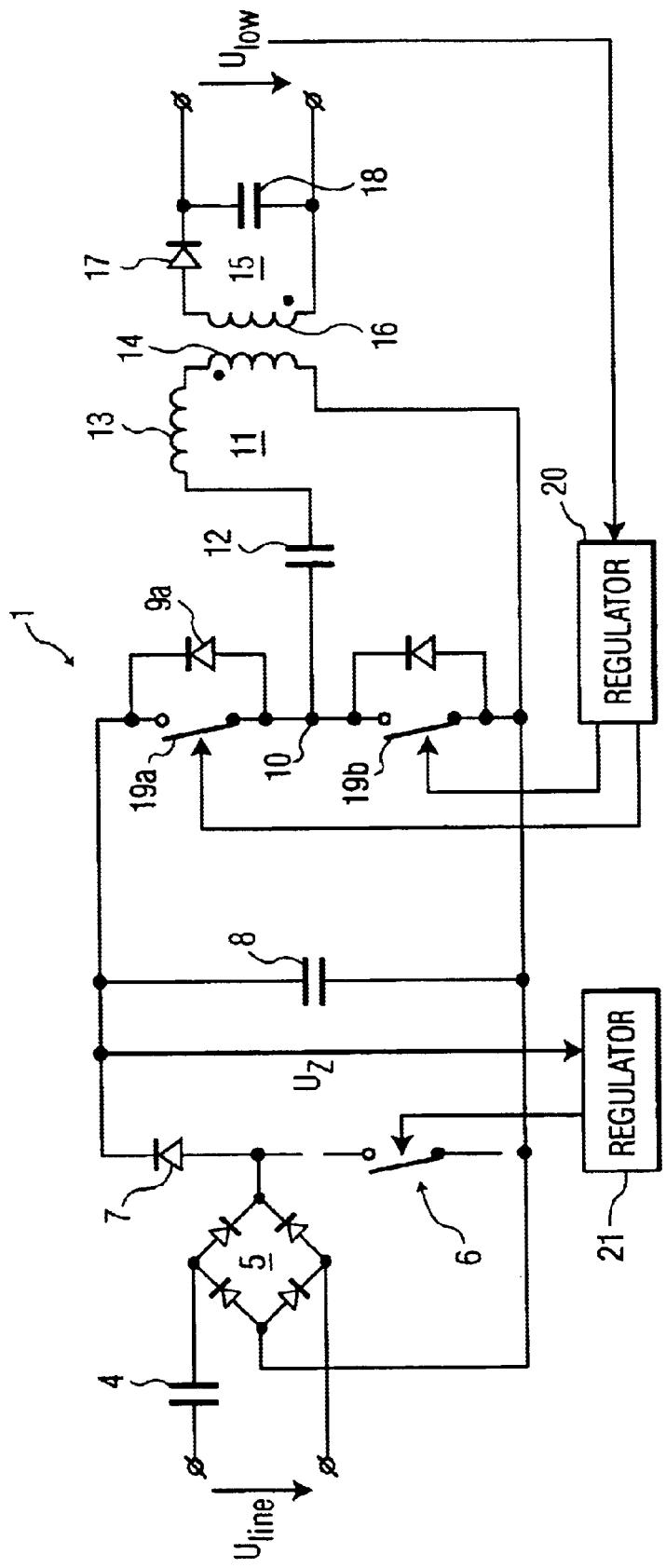
FIG. 2 shows an example of embodiment of the invention with low voltage regulated via the frequency or the duty cycle of the half-bridge.
Figure 3:
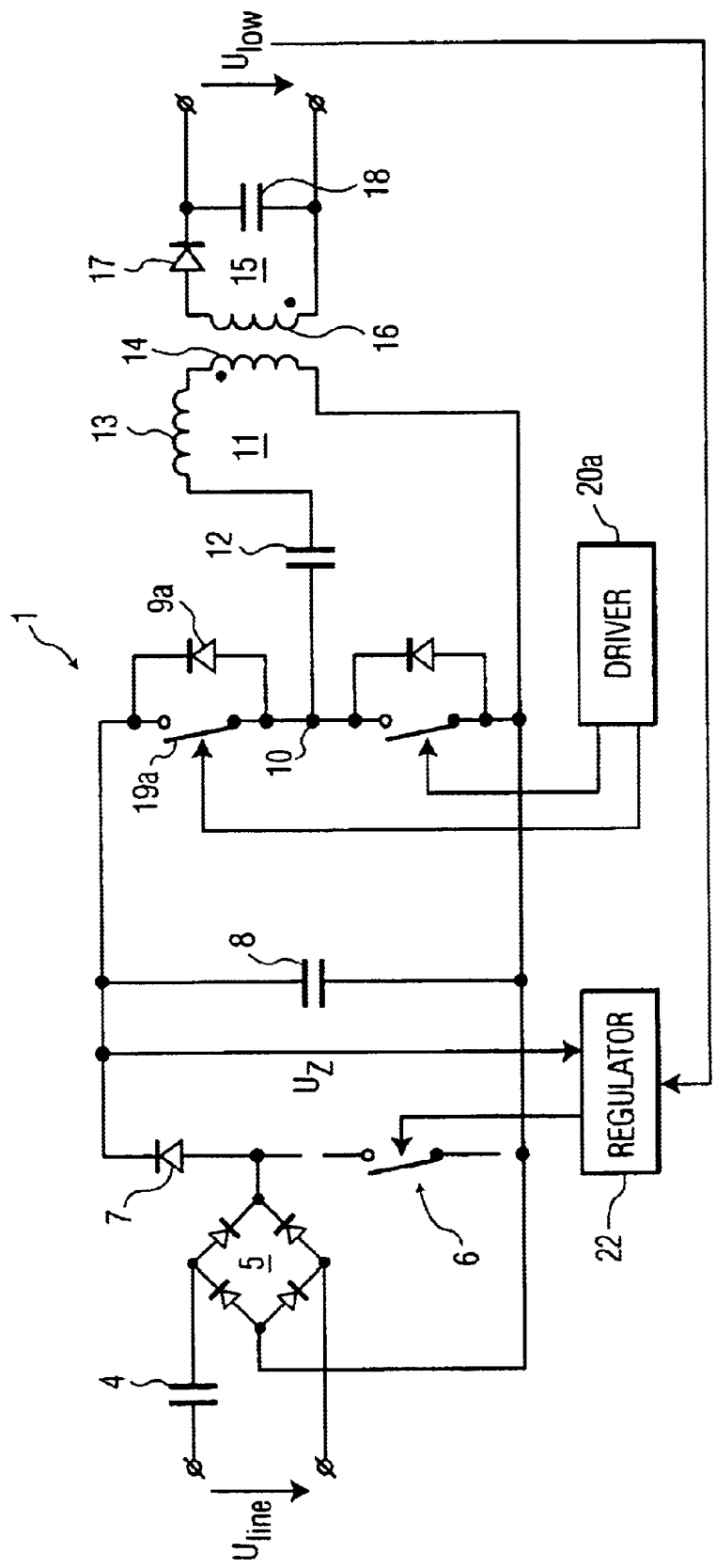
FIG. 3 shows an example of embodiment of the invention with low voltage regulated via the intermediate circuit voltage.

In the case illustrated in FIG. 1, the switches take the form of electronic components. FIGS. 2 and 3 show general switching elements. Another fundamental factor is that the duty cycle of the alternating mode-operated switches may deviate from 50%. In particular, the duty cycle p should here be understood to mean the ratio of the on-time $t_{high}$ to the duration of a switching cycle T, wherein $t_{high}$ is the on-time of the transistor 19a.

The electrical power is here transmitted to the secondary side in accordance with the forward converter principle while the on-off switch 19b is ON.

A distinctive feature is the use of MOSFET transistors, since these already contain the necessary diodes 9a and 9b for the diode half-bridge.

The half-bridge may therefore be obtained by connecting two MOSFET transistors. The capacitors are also already contained in the MOSFET transistors.

An essential feature of this construction is the possibility of turning the transistors on in a de-energized condition. To this end, a time-delay is achieved, which allows a time to pass after the one transistor has been turned off before the other transistor is turned on. During this period, the current flowing through the leakage inductor 13 recharges the drain-source capacitors of the half-bridge transistors in the transformer in such a way that no voltage remains across the transistor which is to be turned on next. It should be expressly mentioned that the capacitors to be recharged may comprise both the drain-source capacitors of the half-bridge transistors and other capacitors of the half-bridge transistors. If it proves necessary, one or two capacitors may also be installed externally.

A further essential feature of this circuit arrangement is the potential insulation, which is provided between the primary circuit 11 and the secondary circuit 15. The transformer between the primary circuit 11 and the secondary circuit 15 is therefore in essence used for the potential insulation.

Since the intermediate circuit voltage is approximately 50 volts, while the desired low voltage is approximately 5 volts, simple transformers may be used which entail only low costs. However, the present circuit may also be suitable for producing high output voltages if appropriate transformers are used.

While FIG. 1 shows an example of embodiment in which changes in the low voltage $U_{low}$ are not used for regulation, the examples of embodiment according to FIGS. 2 and 3 show possible ways of using changes in the low voltage for regulation thereof. However, it should be expressly pointed out that, in the example of embodiment according to FIG. 1, a regulator 21 or 22 is also necessary to drive the switch 6, wherein, according to the examples of embodiment in FIGS. 2 and 3, the regulator 21 or 22 is driven via the intermediate circuit voltage $U_Z$. In any case, however, the regulator 21 or 22 always has to have the intermediate circuit voltage $U_Z$ as input voltage to prevent an inadmissibly high rise in the intermediate circuit voltage.

FIG. 2 shows an example of embodiment in which, to regulate the low voltage $U_{low}$, the alternating mode clock frequency or duty cycle is generated via a regulator 20, the input signal of which is tapped at the output of the second circuit block 3.

To this end, the regulator 20 is connected with the output of the second circuit block 3 and acts on the two switches 19a and 19b, which are switched in alternating mode.

In FIG. 2, the intermediate circuit voltage $U_Z$ is regulated via a separate regulator 21, the input signal alone of which is the intermediate circuit voltage $U_Z$ and the output signal of which acts on the on-off switch 6.

In this circuit arrangement, it should be assumed that the intermediate circuit voltage $U_Z$ is kept substantially constant without feedback from the second circuit block, while the output voltage $U_{low}$ is corrected to a constant value via a corresponding regulating circuit of the second circuit block. The regulating circuit here acts on those components of the second circuit block 3 which are responsible for the alternating mode duty cycle.

The on-off switch 6 is appropriately a MOSFET transistor, the drive of which is connected with the regulator 21.

As an alternative thereto, FIG. 3 shows an example of embodiment of the invention in which the component 20a responsible for the alternating mode is not a regulator but a drive and is therefore not connected with the output of the circuit arrangement. Here, the semiconductor switches 19a and 19b are driven independently of the voltage present at the respective output of the circuit.

In this example of embodiment of the invention, however, the output signal of the circuit arrangement is tapped and impressed on the regulator 22, which corrects the intermediate circuit voltage $U_Z$ by actuation of the electrical/electronic switch 6.

Figure 4:
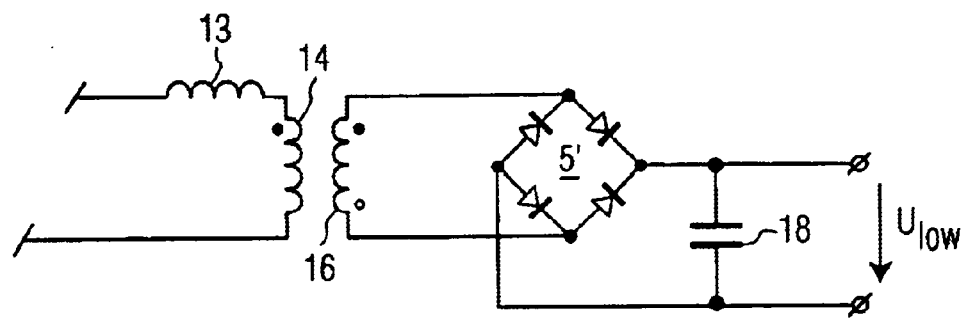
FIG. 4 shows an example of embodiment with two-way rectification of the secondary side.

Additionally, it should be expressly mentioned that only a single output diode 17 is provided, since one-way rectification is sufficient for the intended instances of application. Nonetheless, it goes without saying that two-way rectification may also be provided. In the example of embodiment according to FIG. 4, a two-way rectifier 5' is provided on the secondary side.

Otherwise, the mode of operation of this example of embodiment corresponds to that stated above.

Figure 5:
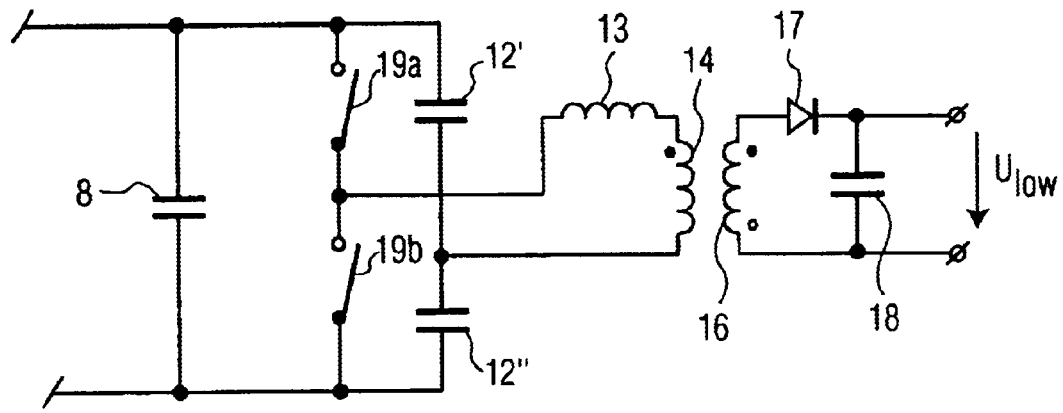
FIG. 5 shows an example of embodiment with a different capacitor circuit.

In addition thereto, FIG. 5 shows an example of embodiment in which a transformer with equidirectionally wound windings is used instead of the non-equidirectionally wound transformer windings.

It should be expressly stated that the invention may also be used with such transformers, wherein FIG. 5 additionally shows an example of embodiment in which the capacitor 12 is divided into two sub-capacitors 12' and 12" to remove the DC component in accordance with FIGS. 2 and 3.

The half-bridge point 10 is connected, as before, between the switches 19a and 19b, while the primary circuit 11, starting from the half-bridge point 10, is connected with its other end between the two sub-capacitors 12' and 12".

Figure 6:
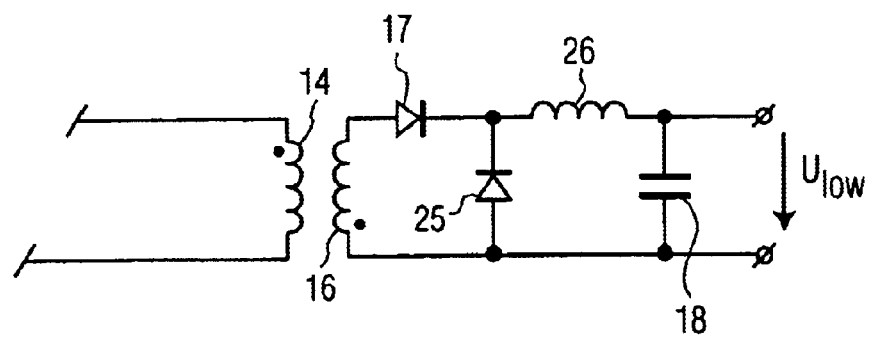
FIG. 6 shows an example of embodiment with inductive output filtering.

In addition thereto, FIG. 6 shows a further arrangement in which the inductor 26 is connected in series with the output diode 17 and a diode 25 with the opposite polarity is additionally connected between the cathode of the output diode 17 and the opposite end of the secondary coil 16.

In this case, inductive output filtering is performed.

A particular advantage of the invention is that separate stand-by supplies may also be obtained in televisions, video-recorders etc., the main power supplies of which naturally cannot fulfill future standards for limited power consumption in stand-by mode.

List of reference numerals

| | |
|---|---|
| 1 | Electrical circuit arrangement |
| 2 | First circuit block |
| 3 | Second circuit block |
| 4 | Input capacitor |
| 5 | Rectifier |
| 5' | Two-way rectifier at output |
| 6 | On-off switch |
| 7 | Diode |
| 8 | Bus capacitor |
| 9a | First diode of half-bridge |
| 9b | Second diode of half-bridge |
| 10 | Half-bridge point |
| 11 | Primary circuit |
| 12 | Capacitor for removing DC component |
| 12' | Sub-capacitor for removing DC component |
| 12" | Sub-capacitor for removing DC component |
| 13 | Series coil |
| 14 | Transformer for primary coil |
| 15 | Secondary circuit |
| 16 | Transformer for secondary coil |

-continued

List of reference numerals

| | |
|---|---|
| 17 | Output diode |
| 18 | Output capacitor, smoothing capacitor |
| 19a | First semiconductor switch |
| 19b | Second semiconductor switch |
| 20 | Regulator (alternating mode) |
| 20 | Drive (alternating mode) |
| 21 | Electric/electronic drive for 6 |
| 22 | Regulator (intermediate circuit voltage) |
| 25 | Diode |
| 26 | Inductor |

What is claimed is:

1. An electrical circuit arrangement for producing a low-power rectified low voltage from an AC voltage, comprising:
a first circuit block and a second circuit block
wherein
the first circuit block includes:
a rectifier that is configured to provide a rectified voltage from a line voltage,
a voltage limiter circuit that is configured to provide an intermediate voltage from the rectified voltage that is limited to a voltage level that is substantially less than the line voltage, and
a bus capacitor that receives the intermediate voltage and couples the intermediate voltage to an input of the second circuit block; and
the second circuit block includes:
a half-bridge circuit that receives the intermediate voltage and provides an alternating voltage,
a primary circuit that receives the alternating voltage, and
a secondary circuit, operably coupled to the primary circuit, that includes
at least one output diode that provides the low-power rectified low voltage.

2. An electrical circuit arrangement as claimed in claim 1, wherein
the half bridge circuit comprises semiconductor switches.

3. An electrical circuit arrangement as claimed in claim 2, wherein
each of the semiconductor switches includes a diode.

4. An electrical circuit arrangement as claimed in claim 1, wherein
isolation is provided between primary circuit and secondary circuit.

5. An electrical circuit arrangement as claimed in claim 1, wherein
the low voltage is unregulated.

6. An electrical circuit arrangement as claimed in claim 1, in
the low voltage is regulated.

7. An electrical circuit arrangement as claimed in claim 6, further including
a regulator, the input signal of which is dependent upon the low voltage.

8. An electrical circuit arrangement as claimed in claim 6, wherein the intermediate voltage is regulated via an electrically/electronically drivable switch to regulate the low voltage, which switch may take the input current past the bus capacitor.

9. An electrical circuit arrangement as claimed in claim 8, further including
a regulator that controls the electrical/electronic switch based on:
the intermediate voltage, and
an output of the second circuit block.

10. An electrical circuit arrangement as claimed in claim 1, wherein
the at least one diode includes a single output diode.

11. An electrical circuit arrangement as claimed in claim 1, wherein
the secondary circuit includes capacitive output filtering.

12. An electrical circuit arrangement as claimed in claim 1, wherein
the secondary circuit includes inductive output filtering.

13. An electrical circuit arrangement as claimed in claim 1, wherein
the primary circuit includes a series coil corresponding to a leakage inductor of a transformer.

14. An electrical circuit arrangement as claimed in claim 1, wherein
the first circuit block further includes
a capacitor for removing DC component of the alternating voltage that is provided to the primary circuit.

15. An electrical circuit arrangement as claimed in claim 1, wherein
the half-bridge circuit is couple to the primary circuit via a capacitor.

16. An electrical circuit arrangement as claimed in claim 1, wherein
the primary and secondary circuits are coupled via a transformer with non-equidirectionally connected windings.

17. An electrical circuit arrangement as claimed in claim 1, wherein
the primary and secondary circuits are coupled via a transformer with equidirectionally connected windings.

18. An electrical circuit arrangement as claimed in claim 1, wherein the half-bridge circuit is operated asymmetrically.

19. An electrical circuit arrangement as claimed in claim 1, wherein the half-bridge circuit is operated with a duty cycle of approximately 50%.

* * * * *